United States Patent Office 2,853,701
Patented Sept. 23, 1958

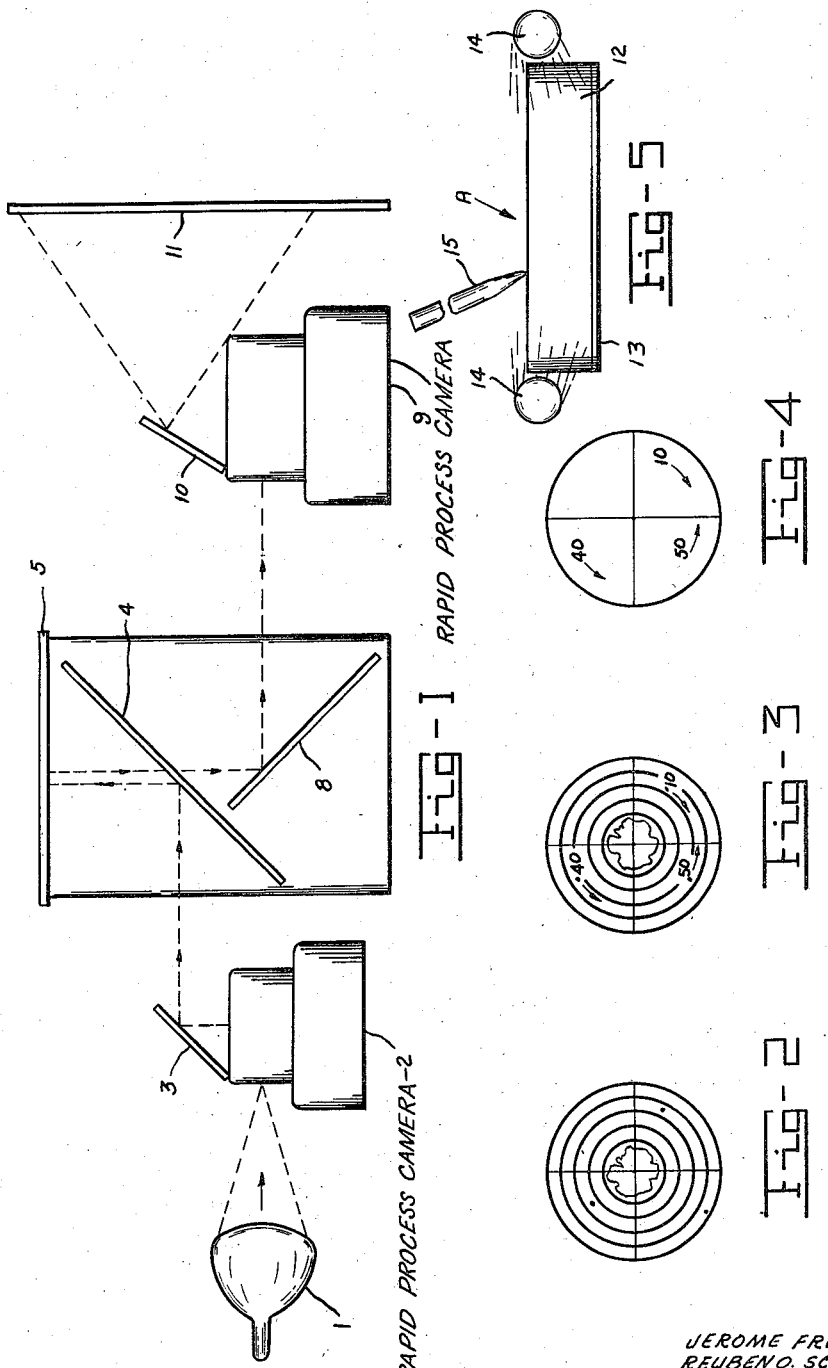

2,853,701

TARGET POSITION INDICATOR

Jerome Freedman, Winchester, Reuben O. Schlegelmilch, Jamaica Plain, and Herbert Sherman, Lexington, Mass., assignors to the United States of America as represented by the Secretary of the Air Force Application December 16, 1954, Serial No. 475,850

10 Claims. (Cl. 343—7.7)

(Granted under Title 35, U. S. Code (1952), sec. 266)

The invention described herein may be manufactured and used by or for the United States Government for governmental purposes without payment to us of any royalty thereon.

This invention relates to a radar plan position indicating system, and more particularly to improvements in visual indication of radar information.

One object of the present invention is to produce a high resolution flickerless picture of the cathode ray tube (C. R. T.) as an aid to the plotter.

Another object is to transmit to the data receiving center only the plots of the target or targets of interest with all non-essential information eliminated.

The invention will be described with reference to the accompanying drawing wherein:

Fig. 1 is a schematic diagram of the target position indicator.

Fig. 2 is a picture of the image received by the C. R. T.

Fig. 3 is a top view of the translucent screen showing the image on the C. R. T. plus markings or plots made by the plotters.

Fig. 4 is a view of the image of the plots on the large screen after the C. R. T. image has been eliminated.

Fig. 5 is a side view of the translucent screen.

Referring to Fig. 1 a radar set indicating means of known type, such as a radar plan position indicator (P. P. I.) is provided with cathode ray tube 1 (C. R. T.). This tube is controlled in the usual manner by output signals from the radar set and it shows the positions of reflecting objects, such as aircraft, as luminous spots or "pips" on the tube. A rapid process camera 2 of known type, such as the "U. S. A. F. Type No. AN/UFA–2" is set to record or photograph the image on the C. R. T. during each revolution of the antenna. The film is rapidly developed by the camera, and after the second frame of the film has been exposed to the image on the C. R. T. during the succeeding revolution of the antenna, the first frame is advanced to projector 3 where the image, see Fig. 2, on the film is optically projected onto transparent mirror 4, and from there to the translucent screen indicated generally at A on table 5.

The screen A comprises a transparent Plexiglas plate 12 with fluorescent lights 14 positioned at the edges in a manner common to radar plotting boards. The Plexiglas plate is backed up by a translucent material 13 such as tracing cloth, see Fig. 5, which acts as an image surface or screen for the projection of the image on the film in camera 2.

The plotters observe the radar data projected onto the translucent screen and using marker 15 mark the target positions so they can be rephotographed, and add any additional information needed to complete the picture, such as track description, identification, etc. The edge lighting of the translucent screen causes the marks to appear as sources of illumination and become sharply visible. The composite image on the screen, see Fig. 3, travels through transparent mirror 4 to mirror 8 where it is reflected into rapid process camera 9. It is essential to note that the plotters marks on the translucent screen contrast with the screen background to a much greater extent than the projected image of the C. R. T. on the screen. The difference is sufficiently great so that the rapid process camera 9 can be set to record on film only the plotters markings, see Fig. 4. This film is developed and advanced to projector 10 where it is projected onto 11 for evaluation.

In use, rapid process camera 2 records the picture on the C. R. T. for each revolution of the antenna. Each image in succession is projected onto translucent screen 5. Plotters at the screen mark the screen in accordance with the movements of the target as shown by the successive images of the C. R. T. projected on the screen. These successive marks are continuously recorded by rapid process camera 9 and projected onto screen 11, so the evaluator is able to follow the motion of the target with all extraneous information eliminated.

In the embodiment disclosed in the drawing, rapid process cameras have been used to record the image on the cathode ray tube for each revolution of the antenna. It is obvious, however, that this can be performed manually by sketching these images on a piece of paper. It may be expedient to use paper having a radar view of fixed objects that always appear on the radar screen already printed to facilitate sketching the positions of the moving objects on the paper. This recorded image is then projected or placed onto screen 5 where plotter's marks are added. In the same way, the image of the plotter's marks may be manually sketched on tracing paper and projected or placed onto a larger screen for evaluation.

While we have described above the principles of our invention in connection with specific apparatus, it is to be clearly understood that the invention is made only by way of example and not as a limitation of the scope of our invention.

We claim:

1. In an apparatus of the class described, the combination of an indicator, means for recording data supplied by the indicator, a screen comprising a plate of transparent material having a translucent backing, means for projecting an image of the recorded data onto the screen, plotter's marks positioned on the screen in accordance with the information supplied by the projection of the indicated data on the screen, edge lighting on the periphery of the screen causing the plotter's marks on the screen to appear sharper and clearer than the image of the indicator data on the screen, a rapid process camera set to be sensitive only to the more visible plotter's marks and insensitive to the projected image of the recorded indicator data on the screen for recording the position of the plotter's marks on the screen.

2. The invention set forth in claim 1 wherein the photographic image of the plotter's marks is reprojected onto a large screen.

3. The invention set forth in claim 2 wherein the screen plate of transparent material is Plexiglas, and the translucent backing for the Plexiglas is tracing paper.

4. The invention set forth in claim 1 wherein the indicator is the cathode ray tube of a radar moving target indication system.

5. In an apparatus of the class described, the combination of an indicator, means for recording a continuous sequence of data supplied by the indicator, a screen comprising a plate of transparent material having translucent backing, means for projecting recorded images of the continuous sequence of data onto the screen, plotter's marks positioned on the screen in accordance with the continuous sequence of data supplied by the projection of the indicator data on the screen, edge lighting on the periphery of the screen causing the plotter's marks to appear sharper and clearer than the projected images of the indicator data, a rapid process camera set to be sensitive only to the more visible plotter's marks and insensitive to the projected images of the recorded indicator data on the screen, for recording the position of the plotter's marks on the screen.

6. The invention set forth in claim 5 wherein the photographic images of the plotter's marks are continuously projected onto a large screen.

7. The invention set forth in claim 5 wherein the plate of transparent material is plexiglass and the translucent backing is tracing cloth.

8. The invention set forth in claim 5 wherein the indicator is the cathode ray tube of a radar moving target indication system.

9. In an apparatus of the class described, the combination of an indicator, first recording means for recording data supplied by the indicator, a screen, means for projecting an image of the recorded data onto the screen, plotter's marks positioned on the screen in accordance with the information supplied by the projection of the indicator data on the screen, illuminating means associated with the screen for causing the plotter's marks to contrast with the screen to a greater extent than the image of the recorded data on the screen contrasts with the screen, second recording means set to be sensitive to the plotter's marks on the screen and insensitive to the projected image of the recorded data on the screen for recording the position of the plotter's marks on the screen.

10. The invention set forth in claim 9 wherein the screen comprises a plate of transparent material having a translucent backing, and wherein the illuminating means associated with the screen comprises edge lighting on the periphery of the screen for causing the plotter's marks to contrast with the screen to a greater extent than the image of the recorded data contrasts with the screen.

References Cited in the file of this patent

UNITED STATES PATENTS

| | | |
|---|---|---|
| 2,485,663 | Rusch et al. | Oct. 25, 1949 |
| 2,506,127 | Allen | May 2, 1950 |
| 2,508,562 | Bonner | May 23, 1950 |
| 2,526,682 | Mulberger et al. | Oct. 24, 1950 |
| 2,580,240 | Newman | Dec. 25, 1951 |
| 2,655,836 | Sherwin | Oct. 20, 1953 |
| 2,667,634 | Hart | Jan. 26, 1954 |
| 2,678,439 | McConnell | May 11, 1954 |
| 2,688,278 | Tuttle | Sept. 7, 1954 |
| 2,755,715 | Tuttle et al. | July 24, 1956 |